J. L. CHESNUTT.
BALL BEARING SWIVEL CASTER.
APPLICATION FILED APR. 12, 1919.
1,344,864.
Patented June 29, 1920.
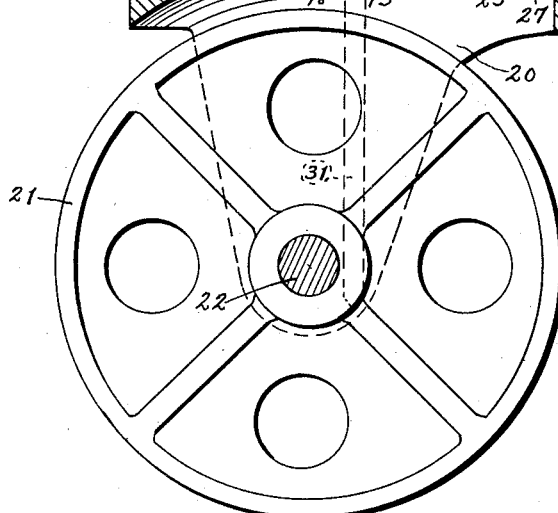
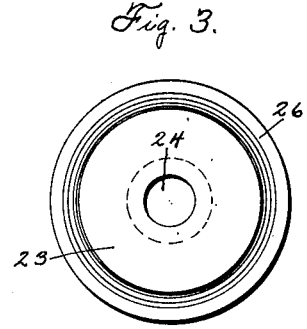
INVENTOR:
J. L. CHESNUTT
By
Earl M. Sinclair
Att'y.

UNITED STATES PATENT OFFICE.

JOHN LOUCIEN CHESNUTT, OF KANSAS CITY, MISSOURI, ASSIGNOR TO THE SERVICE CASTER & TRUCK COMPANY, OF KANSAS CITY, MISSOURI, A CORPORATION OF MISSOURI.

BALL-BEARING SWIVEL-CASTER.

1,344,864.  Specification of Letters Patent.  Patented June 29, 1920.

Application filed April 12, 1919. Serial No. 289,485.

*To all whom it may concern:*

Be it known that I, JOHN L. CHESNUTT, a citizen of the United States of America, and resident of Kansas City, Jackson county, Missouri, have invented a new and useful Ball-Bearing Swivel-Caster, of which the following is a specification.

The object of this invention is to provide an improved construction for a ball-bearing swivel caster adapted for a wide variety of uses.

A further object of this invention is to reduce to the minimum the friction between the wheel-bearing member and the load-carrying member, so that the wheel member and wheel will swivel with the application of a minimum of force and turn quickly when the direction of travel is altered, and with a minimum of binding and wear between the two main parts of the caster as well as with respect to the supporting surface.

A further object of this invention is to provide a caster which will swivel or turn instantly under lateral pressure and without perceptible dragging or sliding, thereby reducing the wear on the supporting surface.

A further object of this invention is to produce a caster which will be especially effective in use and yet very simple and inexpensive in construction.

A further object of this invention is to provide an improved construction whereby the size of the top plate may be reduced, in proportion to the height of the caster, without reducing the ball-bearing surfaces between the wheel-carrying member and the top plate and between the wheel-carrying member and the pivot.

A further object of this invention is to provide a caster which tends automatically to free the load-bearing balls from dirt, sand, gummy substances and the like that tend to impede swiveling or wear the balls and race.

A further object of this invention is to provide a swivel caster which may be oiled conveniently without turning, tipping or inverting the object to which it is secured.

My invention consists in the construction, arrangement and combination of elements hereinafter set forth, pointed out in my claims and illustrated by the accompanying drawing, in which—

Figure 1 is a vertical section illustrating my improved caster, the supporting wheel being shown in full lines. Fig. 2 is a bottom plan of the top plate detached. Fig. 3 is a plan of the keeper plate detached.

In the construction of the caster as shown the numeral 10 designates generally a top plate, which is preferably frusto-conical in form and provided with an integral peripheral flange 11 of irregular contour in which are formed screw or bolt holes 12, by means of which the caster may be secured to an object to be supported. The top plate 10 is formed with a centrally located hub 13, substantially frusto-conical in form, extending from its lower surface, and is also formed with a ball race 14 in its lower surface, of relatively large diameter, which is concentric with the hub 13. The top plate 10 also is formed with a centrally located recess 15 in its upper surface, from which a rivet hole 16 opens through said plate to the center of the hub 13 thereof.

A wheel-carrying member 17 is provided and is formed with a circular opening 18 having an integral, inwardly projecting flange 19 at its top. The hub 13 of the top plate is adapted to extend within the central opening 18 of the wheel-carrying member and be retained in close relation to the inner margin of the flange 19, said flange preferably being beveled to conform substantially to the shape of said hub. The wheel-carrying member 17 is formed with spaced downwardly projecting flanges or wings 20, one only of which is shown, between which the wheel 21 is mounted and pivoted on an axle 22 carried by said wings.

A circular keeper plate 23 is provided and is of a size to be received within the circular opening 18 of the wheel-carrying member from beneath, passage upward of said keeper plate through said opening being prevented by the flange 19. The keeper plate 23 is formed with a central rivet hole 24 and is adapted to be brought into contact with the lower surface of the hub 13, through the opening of the wheel-carrying member, and secured rigidly to said hub by means of a rivet 25. The keeper plate 23 is formed with a peripheral groove 26 constituting a ball race, in its upper surface, and a series of bearing balls 27 are mounted in said race and contact with the lower surface of the flange 19. Thus the rivet 25, keeper plate 23 and balls 27 form a means for connecting the wheel-carrying member to the top plate, and said keeper plate and balls provide a frictionless pivotal connection between said wheel-carrying member and top plate or load-bearing member. The balls 27, keeper plate and flange 19 prevent separation of the wheel-carrying member and top plate through perpendicular pressure, and said balls produce lateral motion of the wheel member and wheel through horizontal pressure between the member 17 and groove or ball race of the keeper. The balls 27 also prevent the wheel-carrying member from tipping downwardly in front when the wheel 21 passes over an obstruction, and prevent and reduce binding friction and wear on the parts during passage over an obstruction.

Bearing balls 28, preferably of larger diameter than the balls 27, are mounted between the top plate 10 and wheel-carrying member 17, being located in the race 14 of said plate and contacting the plane upper surface of said wheel member concentric with and materially spaced from the circular opening 18 and hub 13. The balls 28 receive downward pressure only, on account of the plane track on which they travel and serve to bear the load without lateral pressure, permitting them to turn with less resistance and causing the caster to swivel easily and quickly.

Major portions of the wings 20 are rearwardly of the vertical axis of the wheel-carrying member 17 and keeper plate 23, and the axle 22 also is rearwardly of such axis, so that the wheel 21 trails relative to the vertical axis of the caster.

The forward upper margins of the wings 20 may be connected by an integral downwardly extending flange 29, and the rear upper margins thereof by a rearwardly and downwardly extending flange or bridge 30. The wings 21 also may be formed with vertical ribs 31 on their outer faces, one of which is indicated by dotted lines in Fig. 1.

Particular attention is drawn to the keeper plate 23, which is separately formed and provides a convenient means for connecting the wheel-carrying member 17 to the top plate 10, after the insertion of the balls 27 and 28 by the affixing of the rivet or member equivalent thereto. This keeper plate is of relatively large diameter and is rigidly secured to and against rotary movement independently of the top plate. The large diameter of the keeper plate, which thus forms the axis for rotation of the wheel and member 17 relative to the load, acts to prevent binding and makes for smooth and easy action of the parts, and in this respect affords a decided advantage over the common types of swivel casters. This easy and quick turning of the wheel member relative to the load member also acts to reduce and tends to prevent wearing of the supporting surface by the wheel. The keeper plate 23 and hub of the load-bearing member contact on plane parallel faces of considerable width or outside diameter, and are held rigidly in such contact by the rivet 25. This tends to prevent oscillation of the load-bearing member relative to the keeper plate on lines transverse to the axis of articulation between the load-bearing member and wheel-carrying member.

It should also be noted that my construction presents an imperforate top plate, when assembled and in use, thus preventing the collection of foreign substances in the ball races. The rivet hole of the top plate is relatively small and in use is entirely closed by the rivet, so that in use the device has no axial opening.

I claim as my invention:—

1. A swivel caster, comprising a load-bearing member adapted to be secured to an object to be supported, a wheel-carrying member in which a wheel is journaled for rotation, one of said members being formed with an opening, through which a portion of the other member projects, and a keeper plate rigidly secured to and in contact with the said projecting portion and adapted to prevent dissembling of said members, one of said members being formed with a ball race, a series of balls being mounted in said race and adapted to support the load, said keeper plate being formed with a ball race, a second series of balls being mounted in the last-named race and adapted to receive lateral pressure, said projecting portion and keeper plate contacting on plane parallel faces, whereby relative oscillation is prevented on lines transversely to the axis of articulation between the load-bearing and wheel-carrying members.

2. A swivel caster, comprising a wheel-carrying member having a supporting wheel journaled therein, said member being formed with an opening in its top having an inwardly projecting peripheral flange, a top plate adapted to be secured to a load object, said top plate being formed with an integral hub projecting within the opening of the wheel-carrying member, said hub being formed with a flat lower face, a keeper plate mounted within the opening of the wheel-carrying member and having a flat upper face contacting with and riveted to said hub, said top plate being formed with an annular ball race in its lower face, bearing balls in said race contacting a plane upper portion of said wheel-carrying member, and bearing balls between said keeper plate and the flange of the wheel-carrying member.

3. A swivel caster, comprising a wheel-carrying member having a supporting wheel journaled therein, said member being formed with an opening in its top having an inwardly projecting peripheral flange, a top plate adapted to be secured to an integral load object, said top plate being formed with a hub of considerable diameter projecting within the opening of the wheel-carrying member, a keeper plate of circular form mounted within the opening of the wheel-carrying member and contacting with and secured to said hub, a relatively large circle of bearing balls being interposed between said top plate and wheel-carrying member, said keeper plate being formed with a peripheral groove in its upper surface, and bearing balls mounted in said groove and contacting the lower surface of said flange.

Signed at Kansas City, in the county of Jackson and State of Missouri, this 21 day of March, 1919.

JOHN LOUCIEN CHESNUTT.